(12) United States Patent
Heidingsfelder et al.

(10) Patent No.: US 9,909,454 B2
(45) Date of Patent: Mar. 6, 2018

(54) EXHAUST-GAS TURBOCHARGER

(75) Inventors: Leif Heidingsfelder, Ramstein (DE); Thomas Ramb, Worms (DE); Thomas Fitting, Wonsheim (DE); Michael Stilgenbauer, Bolanden (DE); Ralf Christmann, Kaiserslautern (DE)

(73) Assignee: BorgWarner Inc., Auburn Hills, MI (US)

( * ) Notice: Subject to any disclaimer, the term of this patent is extended or adjusted under 35 U.S.C. 154(b) by 847 days.

(21) Appl. No.: 13/879,936

(22) PCT Filed: Oct. 24, 2011

(86) PCT No.: PCT/US2011/057422
§ 371 (c)(1),
(2), (4) Date: Apr. 17, 2013

(87) PCT Pub. No.: WO2012/058135
PCT Pub. Date: May 3, 2012

(65) Prior Publication Data
US 2013/0202431 A1 Aug. 8, 2013

(30) Foreign Application Priority Data

Oct. 28, 2010 (DE) .................. 10 2010 049 939

(51) Int. Cl.
*F04D 15/00* (2006.01)
*F04D 29/40* (2006.01)
(Continued)

(52) U.S. Cl.
CPC ............. *F01D 25/24* (2013.01); *F01D 17/20* (2013.01); *F02B 37/183* (2013.01);
(Continued)

(58) Field of Classification Search
CPC ............. F04D 15/0005; F04D 15/0011; F04D 15/0016; F04D 15/0022; F04D 29/40;
(Continued)

(56) References Cited

U.S. PATENT DOCUMENTS 4,256,019 A * 3/1981 Braddick .............. F02B 37/186
60/602
4,558,891 A * 12/1985 Wagner ............... F01N 13/1805
24/276

(Continued)

*Primary Examiner* — Logan Kraft
*Assistant Examiner* — Jason Davis
(74) *Attorney, Agent, or Firm* — Eric L. Doyle; Stephen A. Pendorf; Patent Central LLC

(57) ABSTRACT

An exhaust-gas turbocharger (1) having a compressor (2) which has a compressor housing (3), a turbine (4) which has a turbine housing (5), a bearing housing (6) between the compressor housing (3) and the turbine housing (5), and a control capsule (7) which has a housing (8) on which is provided a retaining device (9) which interacts with a fastening device (10) on the turbocharger in order to fix the control capsule (6) to the compressor housing (3), the turbine housing (5) or the bearing housing (6). The retaining device (9) is arranged on an outer circumferential region (11) of the control capsule (7), and the fastening device (10) fixes the retaining device (9) in a non-positively locking manner.

10 Claims, 8 Drawing Sheets

(51) Int. Cl.
  *F02B 37/18* (2006.01)
  *F01D 25/24* (2006.01)
  *F01D 17/20* (2006.01)
  *F02C 6/12* (2006.01)

(52) U.S. Cl.
  CPC .............. *F02B 37/186* (2013.01); *F02C 6/12* (2013.01); *Y02T 10/144* (2013.01)

(58) Field of Classification Search
  CPC ...... F04D 29/403; F02B 37/18; F02B 37/183; F02B 37/186
  USPC ..................... 60/602; 415/213.1, 214.1, 220
  See application file for complete search history.

(56) References Cited

U.S. PATENT DOCUMENTS

| | | | | |
|---|---|---|---|---|
| 6,000,222 A * | 12/1999 | Regnier | ................. | F01D 9/026 60/605.2 |
| 6,205,784 B1 * | 3/2001 | Knaack | ................. | F01D 17/105 60/602 |
| 6,481,911 B1 * | 11/2002 | Streuber | ................. | F16B 3/005 403/280 |
| 6,658,846 B1 * | 12/2003 | McEwan | ............... | F01D 17/105 60/602 |
| 7,114,282 B2 * | 10/2006 | Nakagawa | ............. | A01K 87/06 43/22 |
| 2004/0255581 A1 * | 12/2004 | McEwen | ............... | F01D 17/105 60/602 |
| 2007/0051106 A1 * | 3/2007 | Jones | ................... | F02B 37/186 60/602 |
| 2008/0298953 A1 * | 12/2008 | Harris | ................. | F02B 37/186 415/144 |

* cited by examiner

EXHAUST-GAS TURBOCHARGER

BACKGROUND OF THE INVENTION

Field of the Invention

The invention relates to a turbocharger turbine.

Description of the Related Art

A control capsule of an exhaust-gas turbocharger of said type may be used for example to control a wastegate flap of the turbine, and must for this purpose be fastened to the turbocharger and aligned. The fastening may take place for example to the compressor housing, the turbine housing or else to the bearing housing.

It is an object of the present invention to provide an exhaust-gas turbocharger in which it is possible in a simple manner to realize the required tolerance compensation for adjusting the control capsule on the turbocharger.

BRIEF SUMMARY OF THE INVENTION

The provision of the retaining device on an outer circumferential region of the control capsule yields preferably a multiplicity of different possibilities for the design of the retaining device and for the provision of a fastening device of simple construction for interacting with the retaining device, which fastening device fixes the retaining device and therefore the control capsule by means of non-positive locking, which may be realized for example by means of a suitable clamping action.

Said design simplifies the adjustment of the control capsule on the turbocharger, because for said adjustment, the fastening device can be released and closed in a simple manner in order to be able to impart the required retaining force to the retaining device.

The subclaims relate to advantageous refinements of the invention.

In principle, it is possible according to the invention for the retaining device to be provided directly on a suitable outer circumferential region of the housing of the control capsule, or for said arrangement to be realized indirectly.

In the case of the direct arrangement, it is possible for example for a retaining device in the form of a projection having two parallel engagement surfaces for engagement with the fastening device (10) or a dovetail to be arranged directly on the suitable outer circumferential region, or the outer surface of the respective outer circumferential region itself may serve as a retaining device which interacts with a correspondingly designed fastening device The indirect arrangement means that the retaining device is arranged on an intermediate piece, such as for example a holder, which then in turn can be attached to an outer circumferential surface of the housing of the control capsule.

As a fastening device, it is possible to use not only differently designed clamping pad arrangements (arrangement with two clamping pads, arrangement with one clamping pad and a clamping plate, or so-called drill stand arrangements) but also tension strap arrangements or bracket arrangements.

The fastening device is preferably provided with screw arrangements for imparting the non-positive locking action, which screw arrangements permit simple release and fixing and furthermore permit a continuous adjustment of the clamping force for imparting the required non-positive locking.

BRIEF DESCRIPTION OF THE SEVERAL VIEWS OF THE DRAWINGS

Further details, advantages and features of the present invention will emerge from the following description of exemplary embodiments on the basis of the drawing, in which.

DETAILED DESCRIPTION OF THE INVENTION

Figure 1:
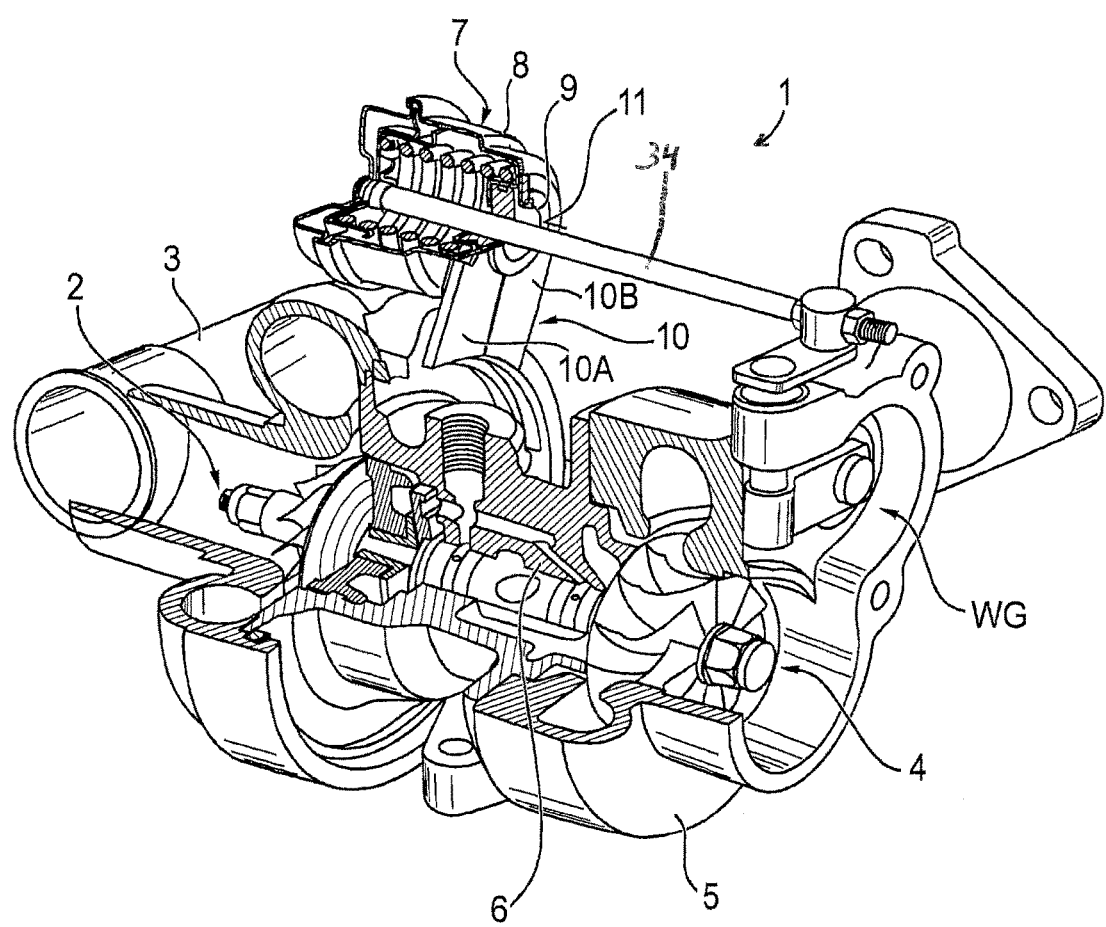
FIG. 1 shows a partially sectional illustration of a first embodiment of an exhaust-gas turbocharger according to the invention.

FIG. 1 shows a perspective, partially cut-away illustration of an exhaust-gas turbocharger 1 according to the invention which has a compressor 2 with a compressor housing 3. The exhaust-gas turbocharger 1 also has a turbine 4 with a turbine housing 5 and has a bearing housing 6 which is arranged between the compressor housing 3 and the turbine housing 5.

As shown in FIG. 1, the exhaust-gas turbocharger 1 is provided with a control capsule 7 which has a housing 8 on which is provided a retaining device 9 which interacts with a fastening device 10 on the turbocharger. In the example, the fastening device 10 fixes the control capsule 7 to the compressor housing 3. As can be seen from the illustration, the control capsule 7 serves in this case to actuate a wastegate arrangement WG.

The design of the fastening device 10 is illustrated only in schematically simplified form and accordingly has two fastening parts 10A and 10B which, for non-positively locking fastening, engage around the retaining device 9 which is arranged on an outer circumferential region 11 of the control capsule 7. The control capsule receives control rod 34. Said arrangement will be explained in detail on the basis of the further figures of the drawing.

Figure 3:
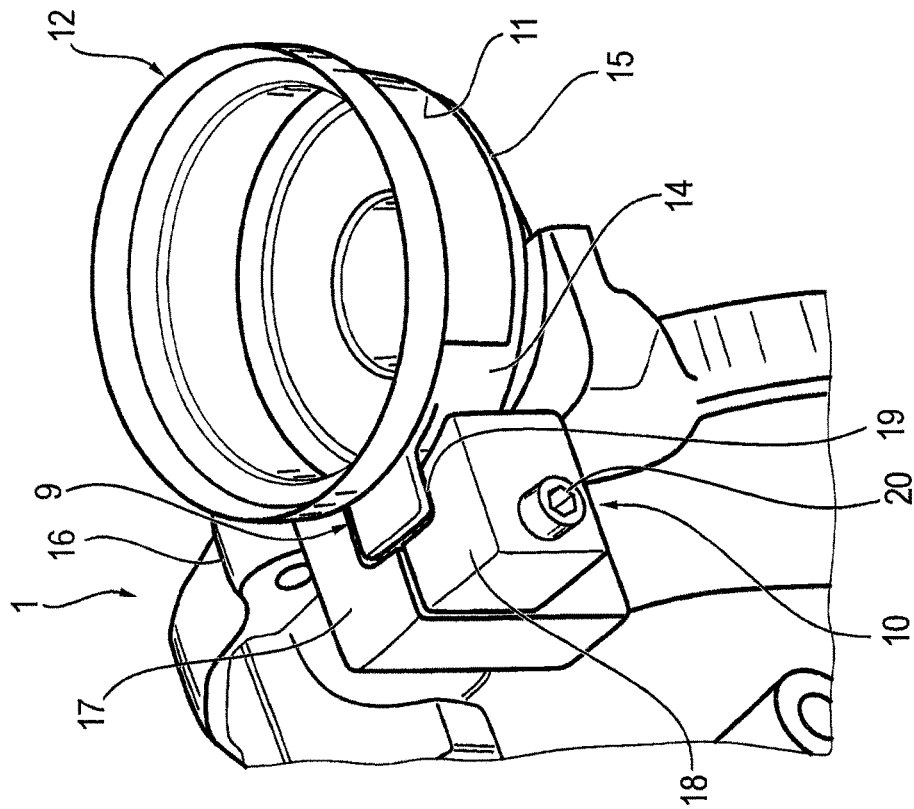
FIGS. 2-4 show perspective illustrations of a part of the exhaust-gas turbocharger according to the invention for the explanation of direct and indirect attachments of the retaining device.
Figure 2:
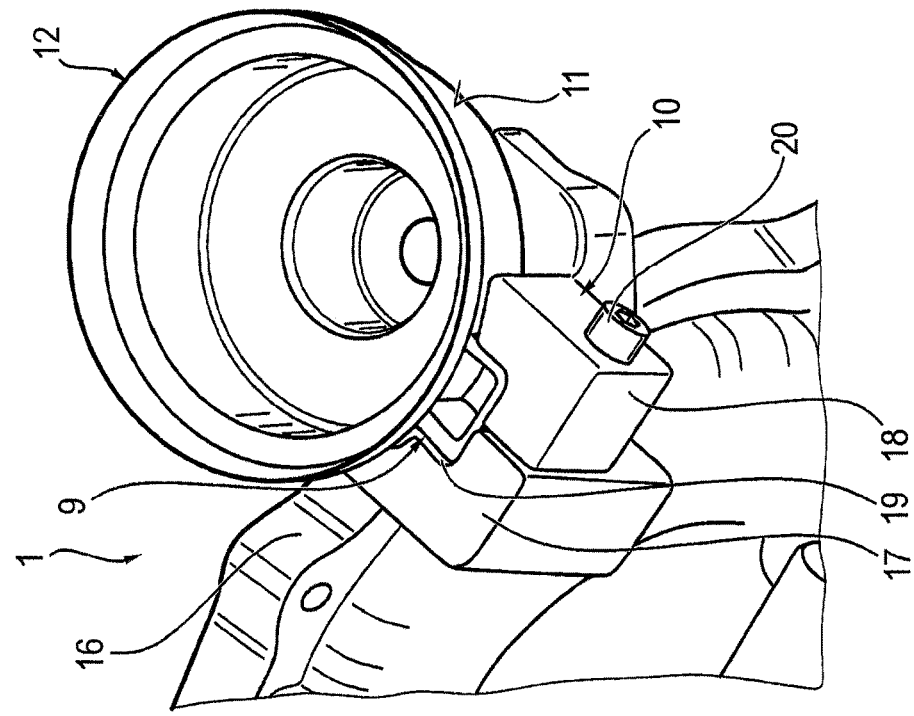
Figure 4:
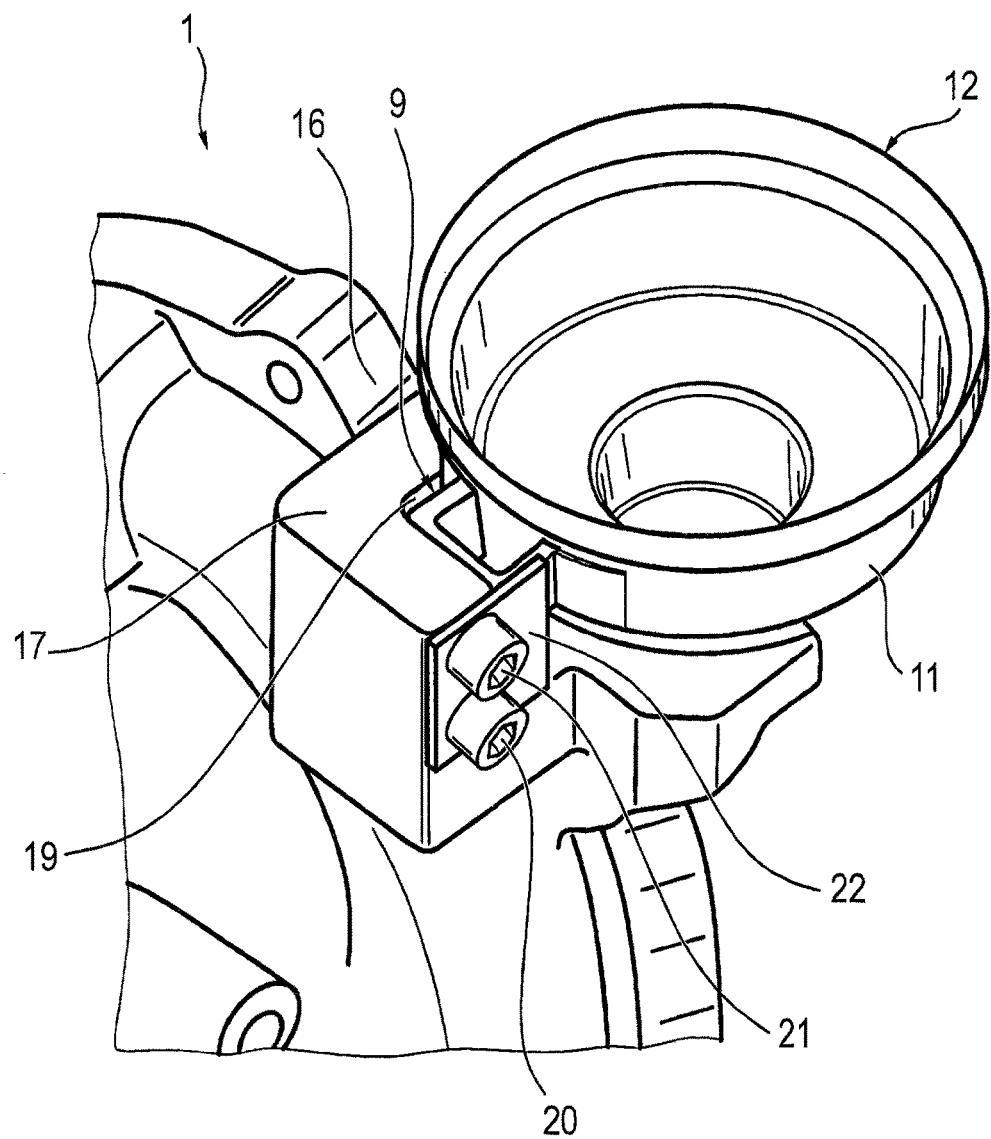

FIGS. 2 to 4 show a possible fastening for the control capsule 7, which control capsule is symbolized in these figures by a housing shell 12 which is part of the housing 8 of the control capsule 7. In this regard, reference may also be made to the illustration of FIG. 5A, in which the control capsule 7 is illustrated in its entirety, wherein in said embodiment, the housing 8 is formed by the housing shell 12 already mentioned above and by a further housing shell 13 connected thereto.

Figure 8:
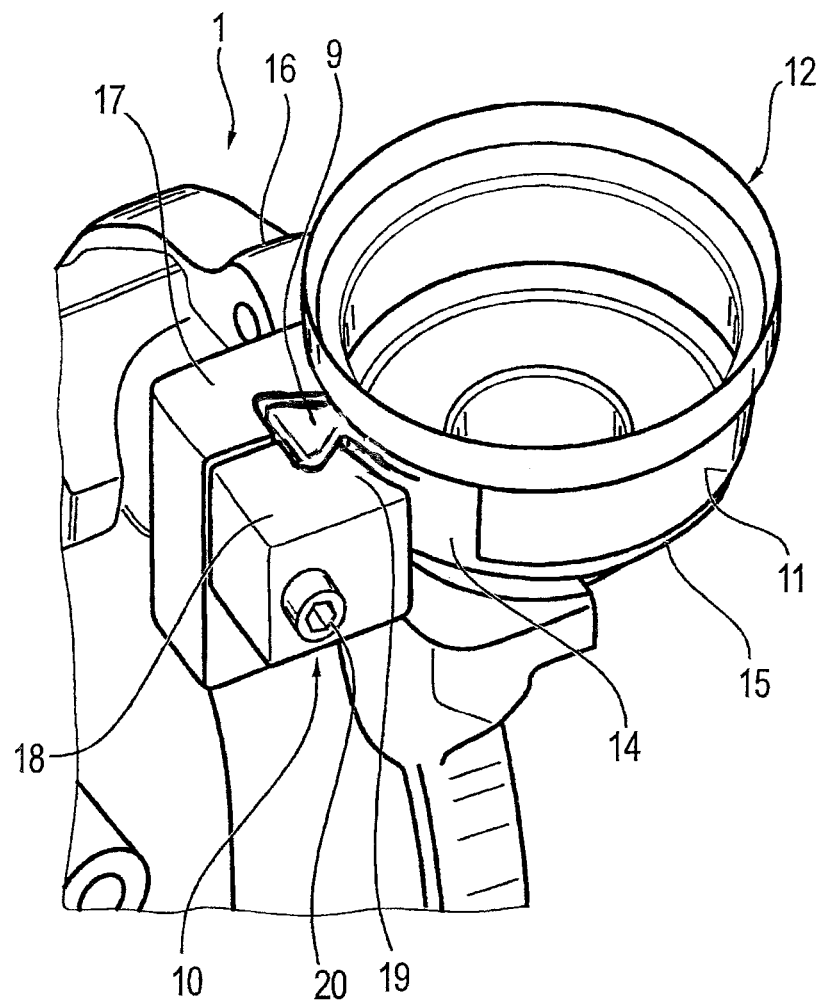
FIG. 8 mirrors FIG. 3 except that the retaining device shown in FIG. 3 in the form of a projection having two parallel surfaces is replaced by a projection device in the form of a dovetail.

In the embodiment according to FIGS. 2 and 4, the retaining device 9 is arranged directly on the outer circumferential region 11 of said housing shell 12, which retaining device is designed in the example with parallel walls between clamping pads 17, 18, or as a dovetail in FIG. 8 which may either be integrally connected to the housing shell 12 or attached thereto, for example by welding.

In the embodiment according to FIG. 3, the retaining device 9 is likewise designed as a projection having two parallel engagement surfaces for engagement with the fastening device (10), but is arranged not directly but rather indirectly on the outer circumferential surface 11, since the retaining device 9 is attached to a holder 14 which is arranged on the outer circumferential surface 11. In the embodiment illustrated in FIG. 3, the holder 14 is connected to a support plate 15 onto which the housing shell 12 is placed. The holder 14 may be connected to the housing shell 12 either in a positively locking manner or in a non-positively locking manner.

The embodiments of FIGS. 2 and 3 share a common design of the fastening device 10. The latter has a clamping pad 17 which, in the example, is integrally connected to a connection region 16 of the exhaust-gas turbocharger 1 and which, in the assembled state illustrated in FIGS. 2 and 3, delimits together with a second clamping pad 18 a clamping groove 19 in which the retaining device 9 in the form of a projection having two parallel engagement surfaces for engagement with the engagement fastening device (10) or a dovetail is arranged and fixed in a non-positively locking manner by the application of a clamping force. For this purpose, a screw connection 20 is provided which extends through the clamping pads 18 and which engages into an internal thread (not visible in FIGS. 2 and 3) of the clamping pad 17 such that the described fixing can be realized in a continuously adjustable fashion.

In the embodiment according to FIG. 4, which with regard to the arrangement of the retaining device 9 corresponds to that of FIG. 2 since the retaining device is arranged directly on the outer circumferential region 11, a clamping plate 22 is provided instead of a second clamping pad as a counterpart for the first clamping pad 17. In the example, the clamping plate 22 can be connected to the clamping pad 17 by means of two screw arrangements 20, 21, and in the assembled state illustrated in FIG. 4, can again delimit the clamping groove 19 in which the retaining device 9 in the form of a projection having two parallel engagement surfaces for engagement with the fastening device (10) or a dovetail is held in a non-positively locking manner, by the application of a clamping force, for the mounting of the control capsule 7.

Figure 5A:
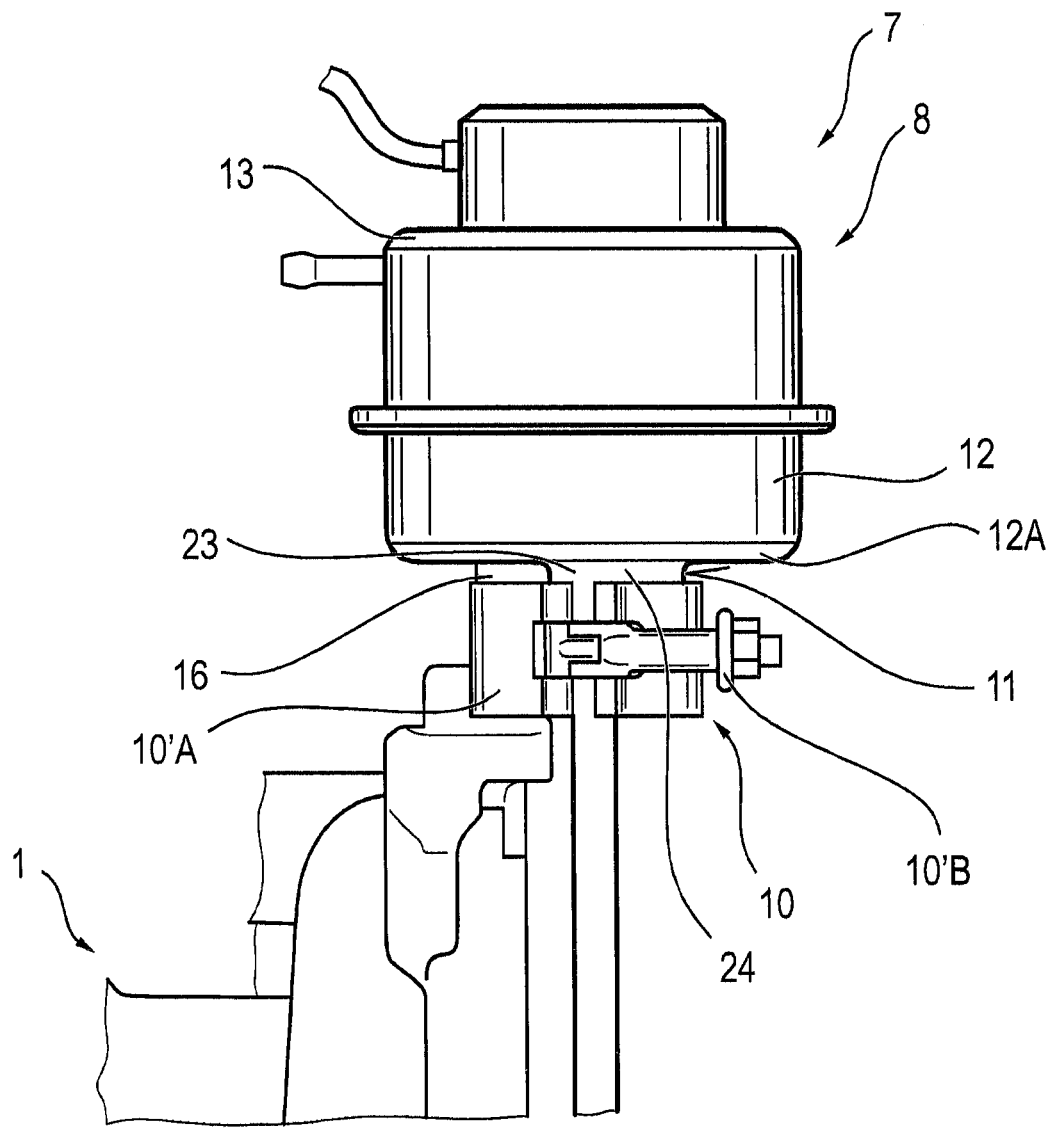
FIGS. 5A-C show perspective illustrations of a part of the exhaust-gas turbocharger according to the invention, in which the retaining device is designed as a tension strap arrangement.

In the embodiment according to FIG. 5A, the control capsule 7 again has the housing 8 with its housing shells 12 and 13. As shown in FIG. 5A, the housing shell 12 is provided on its underside 12A with a housing projection 23 whose outer surface 24, which is arranged on the outer circumferential region 11, forms the retaining device 9 which interacts with a fastening device 10 in the form of a tension strap arrangement. The tension strap arrangement comprises a tension strap 10A which surrounds a connection region 16 of the exhaust-gas turbocharger 1 and the outer surface 24 of the housing projection 23. For non-positively locking fixing, the tension strap 10A is tensioned by means of a screw arrangement 10B, such that in this embodiment, too, the required retaining force for fixing the control capsule 7 is continuously adjustable.

Figure 5C:
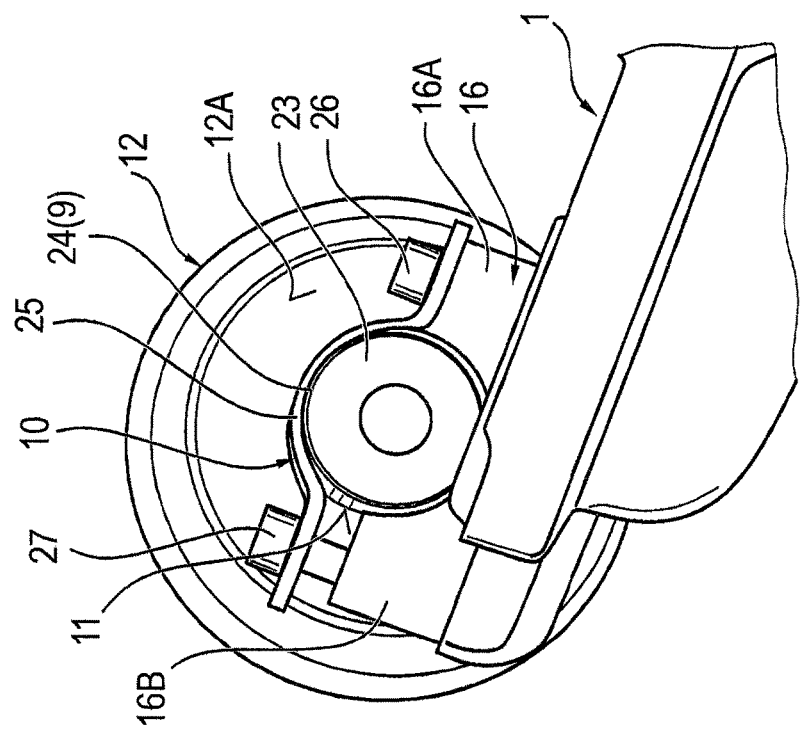
Figure 5B:
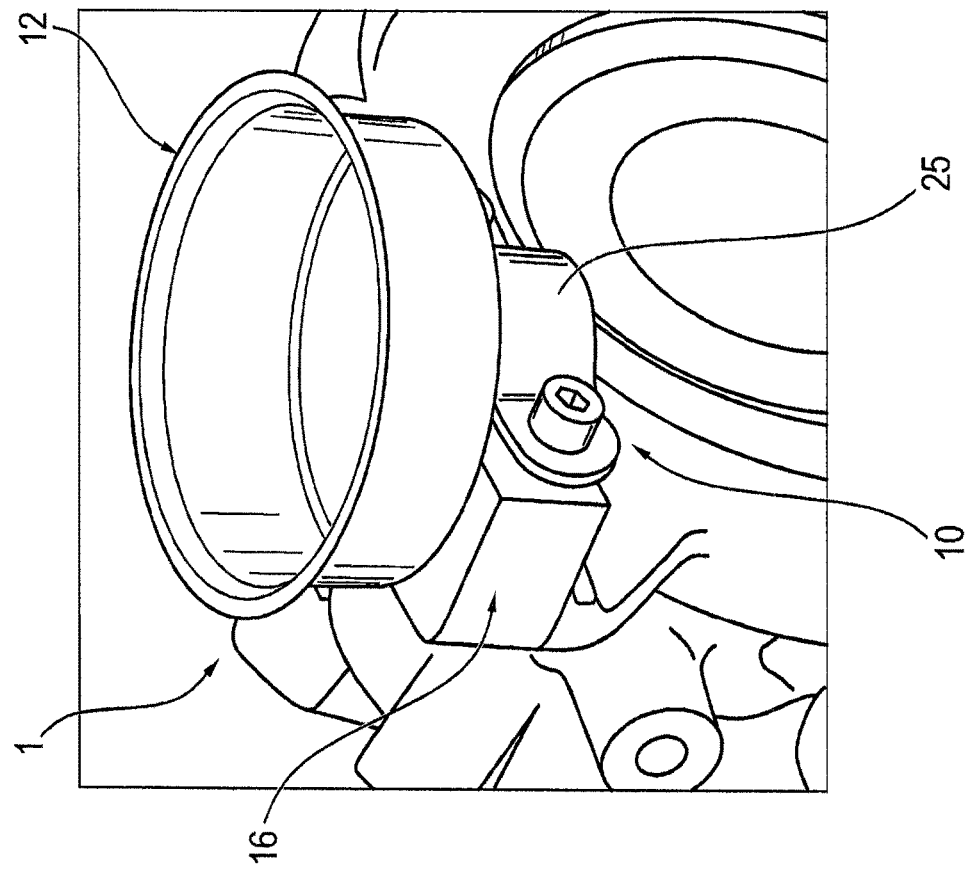

The embodiment according to FIGS. 5B and 5C also illustrates a fastening device 10 in the form of a tension strap arrangement, which is of so-called "tractor design". As can be seen in particular from the illustration of FIG. 5C, which shows the underside 12A of the housing shell 12 in a plan view, the housing projection 23 is provided in this exemplary embodiment too, such that the retaining device 9 is formed by the outer surface 24, which is engaged around by a tension strap 25 of the fastening device 10, which is fixed and clamped to two fastening pedestals 16A and 16B of different height by means of screw connections 26 and 27.

Figure 6:
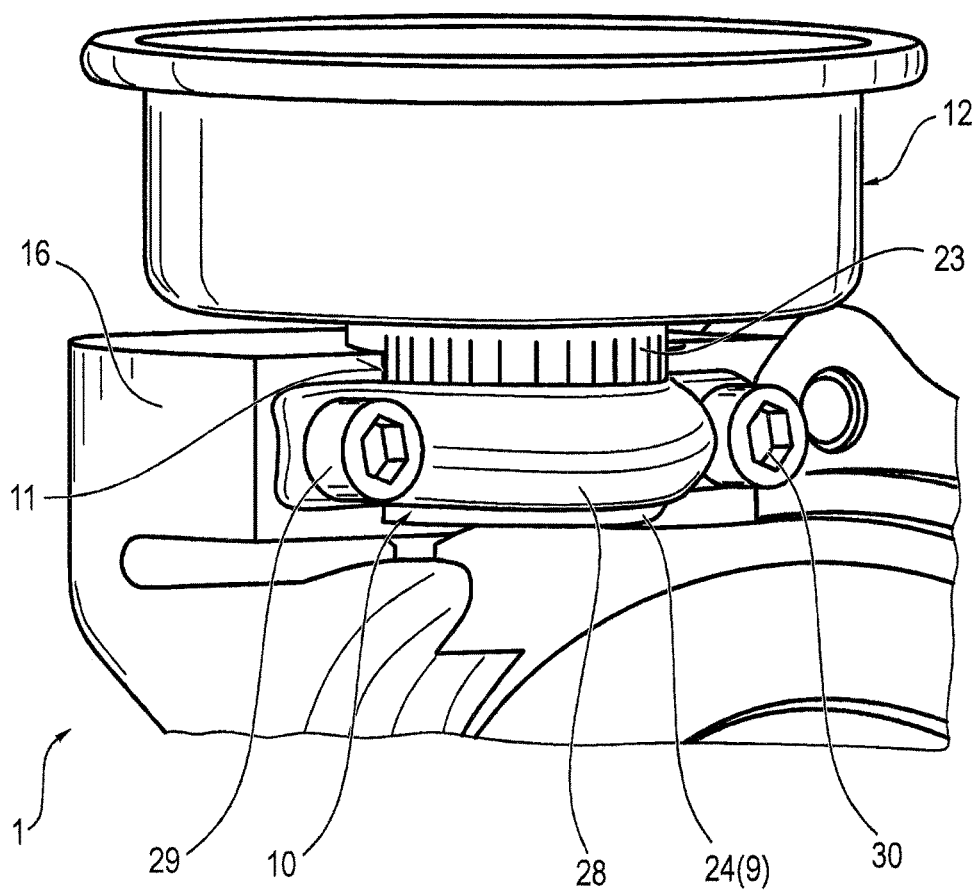
FIG. 6 shows a perspective illustration of a part of the exhaust-gas turbocharger according to the invention, in which the fastening device is designed as a bracket arrangement.

In the embodiment of FIG. 6, the design of the housing shell 12 with a housing projection 23 corresponds to that of FIGS. 5B and 5C. In contrast to a tension strap arrangement, however, a bracket arrangement is provided here as a fastening device 10, which bracket arrangement comprises a retaining bracket 28 which surrounds the housing projection 23 or the outer surface 24 thereof, which again forms the retaining device 9, and is fixed to the connection region 16 of the exhaust-gas turbocharger 1 by means of two screw arrangements 29 and 30.

Figure 7:
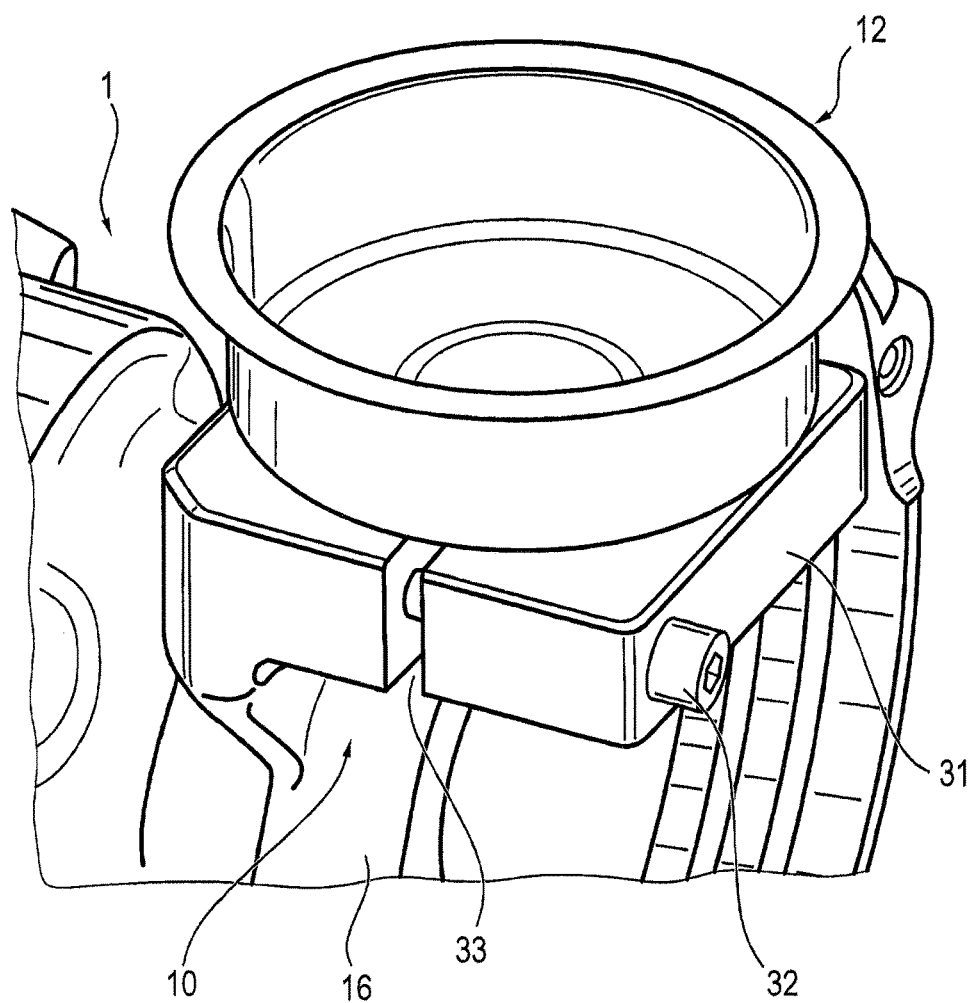
FIG. 7 shows a perspective illustration of a part of the exhaust-gas turbocharger according to the invention in which the fastening device is designed as a so-called "drill stand arrangement"

In the embodiment according to FIG. 7, the control capsule 7 is again provided with a housing shell 12 which has a housing projection 23, said housing projection however not being visible on account of the selected illustration. Said housing projection or the outer surface thereof, which again forms the retaining device 9, is surrounded by a substantially U-shaped so-called drill stand 31 which, in the example, is integrally arranged on the connection region 16 of the turbocharger 1 and which, by means of the provision of an opening 33 open at one side, forms two clampable clamping pads which can be clamped by means of a screw arrangement 32 such that the required non-positively locking fixing can be attained.

In addition to the written disclosure of the invention, reference is hereby explicitly made, to supplement said written disclosure, to the diagrammatic illustration of FIGS. 1 to 7.

LIST OF REFERENCE SYMBOLS

1 Exhaust-gas turbocharger
2 Compressor
3 Compressor housing
4 Turbine
5 Turbine housing
6 Bearing housing
7 Control capsule
8 Housing
9 Retaining device
10 Fastening device
10A, B Fastening parts
10'A Tension strap
10'B Screw arrangement
11 Outer circumferential region
12, 13 Housing shells
12A Underside
14 Holder
15 Support plate
16 Connection region
16A, B Fastening pedestal
17, 18 Clamping pads
19 Clamping groove
20, 21 Screw arrangements
22 Clamping plate
23 Housing projection
24 Outer surface
25 Tension strap
26, 27 Screw arrangements 28 Bracket
29, 30 Screw arrangements
31 Drill stand
32 Screw arrangement
33 Recess
WG Wastegate flap

The invention claimed is:

1. An exhaust-gas turbocharger (1) with
  a compressor (2) which has a compressor housing (3),
  a turbine (4) which has a turbine housing (5),
  a bearing housing (6) between the compressor housing (3) and the turbine housing (5), and
  a control capsule (7) including
    a control rod (34) and
    a control capsule housing (8) having a longitudinal axis, on which control capsule housing (8) is provided a retaining device (9) which interacts with a fastening device (10) in order to fix the control capsule (7) housing (8) to the compressor housing (3), the turbine housing (5) or the bearing housing (6)
  wherein the retaining device (9) is a dovetail or a projection having two parallel engagement surfaces for engagement with complementary engagement surfaces of the fastening device (10),
  wherein the fastening device (10) has a clamping pad (17) including a first engagement surface, which clamping pad is integrally connected to the compressor housing (3), the turbine housing (5) or the bearing housing (6) and which clamping pad (17) is provided with a counterpart (18; 22) having a second engagement surface, the first and second engagement surfaces forming a clamping groove (19), the fastening device further comprising fastening means having a first position for releasing clamping engagement the counterpart (18; 22) against the clamping pad (17) and a second position for urging the counterpart (18; 22) against the clamping pad (17) for clamping engagement of the retaining device (9) in the clamping groove (19), and
  wherein, when said fastening means releases clamping engagement of the counterpart (18; 22) against the clamping pad (17), the control capsule is moveable along the longitudinal axis of the control capsule housing (8), and wherein, when said fastening means urges the counterpart (18; 22) against the clamping pad (17), the control capsule is not moveable along the longitudinal axis of the control capsule housing (8).

2. The exhaust-gas turbocharger as claimed in claim 1, wherein the housing (8) of the control capsule has at least two housing shells (12, 13), and wherein the retaining device (9) is arranged on an outer circumferential region (11) of one (12) of the housing shells (12, 13).

3. The exhaust-gas turbocharger as claimed in claim 1, wherein the retaining device (9) is arranged directly on the outer circumferential region (11) of the housing (8) of the control capsule.

4. The exhaust-gas turbocharger as claimed in claim 1, wherein the retaining device (9) is arranged indirectly on the outer circumferential region (11) of the housing (8) of the control capsule.

5. The exhaust-gas turbocharger as claimed in claim 4, wherein the retaining device (9) is arranged on a holder (14) which is arranged on the outer circumferential region (11) of the control capsule (7).

6. The exhaust-gas turbocharger as claimed in claim 1, wherein the retaining device (9) is a dovetail.

7. An exhaust-gas turbocharger (1) with
  a compressor (2) which has a compressor housing (3),
  a turbine (4) which has a turbine housing (5),
  a bearing housing (6) between the compressor housing (3) and the turbine housing (5), and
  a control capsule (7) which has an actuating rod (34), the control capsule further having a housing (8) having a longitudinal axis, on which control capsule housing (8) is provided a retaining device (9) which interacts with a fastening device (10) in order to fix the control capsule (7) to the compressor housing (3), the turbine housing (5) or the bearing housing (6) in a position which is adjustable along the longitudinal axis of the control capsule housing (8), wherein the retaining device (9) is arranged on an outer circumferential region (11) of the control capsule (7), and wherein the fastening device (10) further comprises fastening means having a first position for releasing clamping engagement with the retaining device (9) and a second position for clamping engagement with the retaining device (9),
  wherein, when said fastening means releases clamping engagement, the control capsule is moveable along the longitudinal axis of the control capsule housing (8), and wherein, when said fastening means is in clamping engagement, the control capsule is not moveable along the longitudinal axis of the control capsule housing (8).

8. The exhaust-gas turbocharger as claimed in claim 7 wherein the fastening device (10) is designed as a tension strap device (10'A, 10'B; 16A, 16B, 25, 26, 27).

9. The exhaust-gas turbocharger as claimed in claim 7, wherein the fastening device (7) is designed as a bracket arrangement (16, 28, 29, 30).

10. The exhaust-gas turbocharger as claimed in claim 7, wherein the fastening device (10) is designed as a drill stand arrangement (31, 32, 33).

* * * * *